US005568881A

United States Patent [19]

Chi

[11] Patent Number: 5,568,881

[45] Date of Patent: Oct. 29, 1996

[54] PIPETTE TIP DISPENSER

[76] Inventor: Wen Y. Chi, 1310 Funston Ave., San Francisco, Calif. 94122

[21] Appl. No.: 509,454

[22] Filed: Jul. 31, 1995

[51] Int. Cl.$^6$ .................... B65G 59/00

[52] U.S. Cl. .................... 221/175; 221/172

[58] Field of Search .................... 221/174, 175, 221/178, 177, 282, 199, 281, 172, 171; 414/788.1, 788.7, 792.7, 793.4, 902, 922

[56] References Cited

U.S. PATENT DOCUMENTS

| | | | |
|---|---|---|---|
| 3,494,014 | 2/1970 | Lundgren | 221/172 |
| 3,531,016 | 9/1970 | Pray | 221/172 |
| 3,840,149 | 10/1974 | Zeller | 221/199 |
| 3,977,574 | 8/1976 | Thomas | 222/391 |
| 4,437,586 | 3/1984 | Columbus | 222/181 |
| 4,744,455 | 5/1988 | Dragotta et al. | 221/172 |
| 5,100,021 | 3/1992 | Mussi et al. | 221/155 |
| 5,111,965 | 5/1992 | Allen et al. | 221/281 |

*Primary Examiner*—Kenneth Noland
*Attorney, Agent, or Firm*—David L. Baker; Henry S. Miller; Rhodes & Ascolillo

[57] ABSTRACT

The invention is an apparatus for organizing and dispensing pipette tips. A hopper receives bulk pipette tips which pass through a diamond shaped apertures in a sieve and drop into the troughs of a separator which moves the aligned and oriented tips to an organizer which separates the tips and aligns them with storage tubes and drops the tips into tubes where they are stacked and stored. An ejection membrane at the opposite end of the tube allows the tips to be removed into a tip holder box one layer at a time.

9 Claims, 6 Drawing Sheets

PIPETTE TIP DISPENSER

BACKGROUND OF THE INVENTION

1. Field of the Invention

The invention relates generally to an apparatus for organizing and dispensing scientific tools and more particularly to sorting and organizing tips for chemical pipettes prior to dispensing.

2. Description of the Prior Art

In laboratories engaged in biotechnology and other chemical endeavors, scientists and technicians use a type of precise volumetric instrument to aliquot very small volumes of samples. This type of volumetric instrument is typically called a "micropipette". They are manufactured by all the major manufactures of scientific equipment.

Each aliquoting activity requires the use of a plastic, disposable tip to avoid contamination from one solution to another. The replacement tip for the micropipette is, as might be expected, manufactured by the same company that manufactures the instrument. For economic reasons, tips are purchased in bulk and prepared, by installing in suitable tip holders, in the laboratory by technicians on a daily basis. Once filled the tip holders are sterilized in an autoclave and distributed to the users. The project is quite time consuming, particularly in an active laboratory where hundreds of tips could easily be consumed on a regular daily basis. It is not unheard of for a technician to spend one hour of his day simply loading tip holders.

There has been suggested and perhaps available, the use of pre-packaged pipette tips however such tips are expensive and still have to be unwrapped and installed in a tip holder. In addition, all pre-packaged tips availabe at the present time are packaging heavy; as a result, a large quantity of plastic wastes are generated. The typical tip holder is a container with a cover and a shelf having apertures where the tips are stored until picked up by the pipette. The tips are use and then discarded. Since the types sizes and capacity of the tips varies greatly, each holder must be designed to handle each make, model and capacity of tip.

U.S. Patents issued show various forms of dispensing and means for orientation prior to dispensing of pipette tips or other articles. For example, U.S. Pat. No. 3,840,149 issued Oct. 8, 1974 to Zeller for a combination golf emblem and tee dispenser having a means for orienting the tee in the dispenser. A U.S. Pat. No. 3,977,574 issued Aug. 31, 1976 to Thomas discloses an actuator system for a dispensing pipette and discloses in detail the mechanism and mode of operation of the dispensing pipette. A mechanically actuated pipette dispenser is shown in U.S. Pat. No. 4,437,586 issued Mar. 20, 1984 to Columbus. The two references most pertinent to the invention presented herein are the U.S. Pat. No. 5,100,021 issued Mar. 31, 1992 to Mussi et al. for a pipette dispenser package which is typical of the manner of bulk distribution of pipette tips, and U.S. Pat. No. 5,111,965 issued May 12, 1992 to Allen et al for an apparatus for feeding pipette tips to the pipette of associated automatic analyzer.

The prior art is not known to have solved the problem of quickly and efficiently filling pipette tip holders and the present invention claims to have found a means for to perform that service with an apparatus heithertofore unknown in the field of pipette tip dispensing.

SUMMARY OF THE INVENTION

The invention is an apparatus directed to the orientation, spacing and stacking of pipette tips for future dispensing into a tip holding apparatus. The invention consists of five fundamental parts, the first being the hopper where the bulk tips are deposited. The bottom wall of the hopper contains a sieve which contains a plurality of diamond shaped apertures which separate the tips and orient the them in a vertical mode where they drop through the sieve and into the longitudinal troughs in the second part. The troughs in part two are open to the troughs of part three and at the appropriate time the tips are moved along each trough from the separator into the organizer of part three. The organizer performs two functions, first, teeth like edges of the organizer bar space the tips and align them over the collection tubes in part four of the invention. Secondly, the organizer trough opens and allows the tips to drop into the collecting tubes of the storage cassette, which is housed in the fourth section. The last or fifth section is located at the base of the collection tubes and provides a means for releasably securing the tips in the tubes. The tip ejector consists of a flexible membrane covering the base of the tubes with an aperture coinciding with tube where the aperture is slightly larger than the tip within the tube. A second membrane abuts the first membrane and has apertures substantially larger than those of the first membrane but the edge of each aperture is offset and overlaps the aperture in the first membrane thereby preventing the tip to simply fall out of the collector tube. In operation a tip holder is placed against the membrane and a small up force is applied, stretching the membrane and thereby enlarging the aperture and allowing an entire layer of tips to drop out into the holder which is lowered and removed, filled with fresh tips, from the apparatus.

It is therefore an object of the invention to provide a new and improved pipette tip dispenser.

It is another object of the invention to provide a new and improved pipette tip dispenser that will separate and organize bulk quantities of pipette tips.

It is a further object of the invention to provide a new and improved pipette dispenser that is simple to operate.

It is still another object of the invention to provide a new and improved pipette tip dispenser that quickly and efficiently fills tip holding storage containers.

It is still a further object of the invention to provide a new and improved pipette tip dispenser which is of a durable and reliable construction.

It is another object of the invention to provide a new and improved pipette tip dispenser which may be easily and efficiently manufactured and marketed without generating plastics in bulk.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set Forth above will become apparent when consideration is given to the following detailed description thereof. Such description makes reference to the annexed drawings wherein.

DETAILED DESCRIPTION OF A PREFERRED EMBODIMENT

Figure 1:
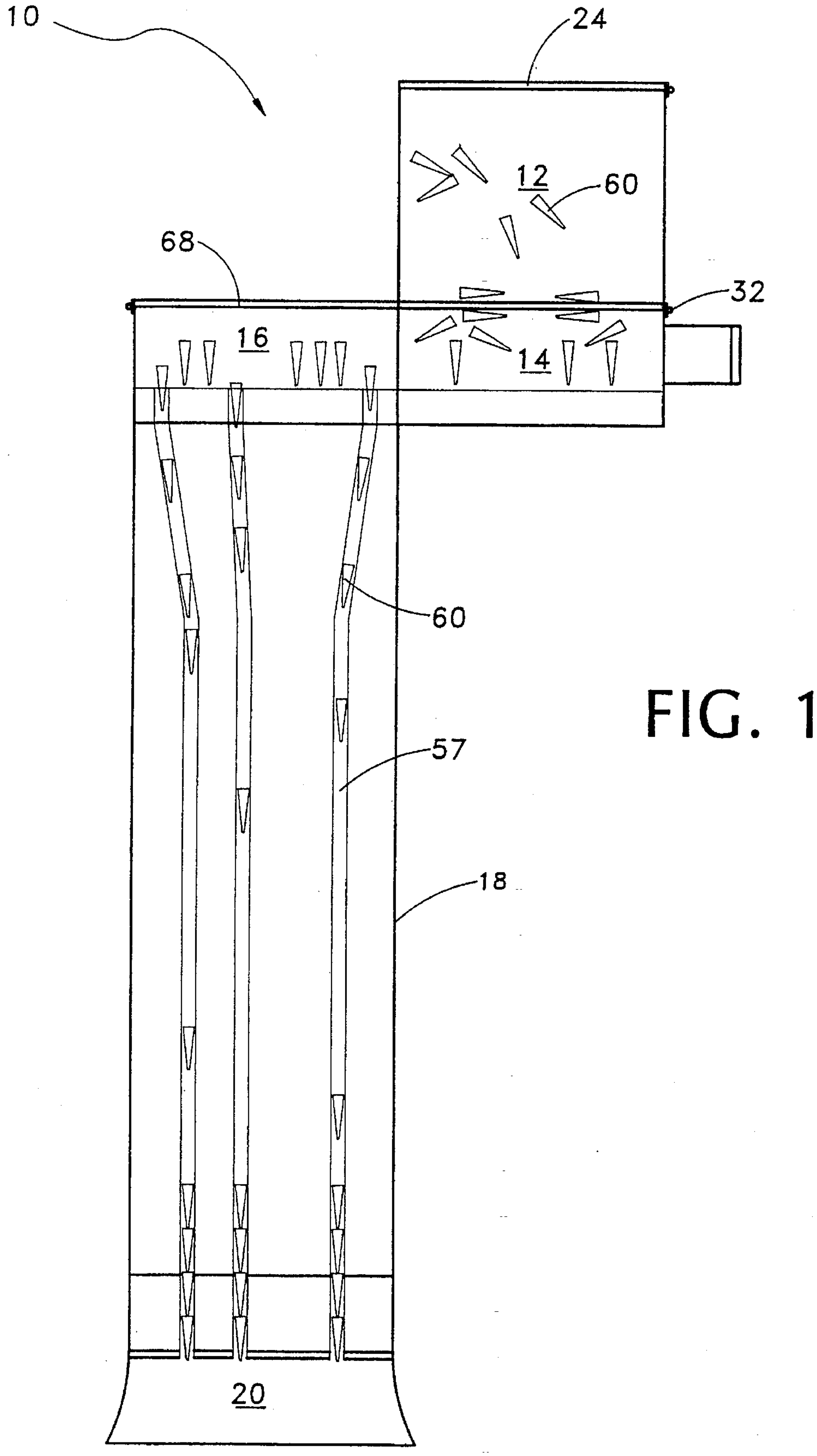
FIG. 1A is a side elevation view showing the relative position of the components.
FIG. 1B is another side elevation view showing the relative position of the compartments.
Figure 1A:
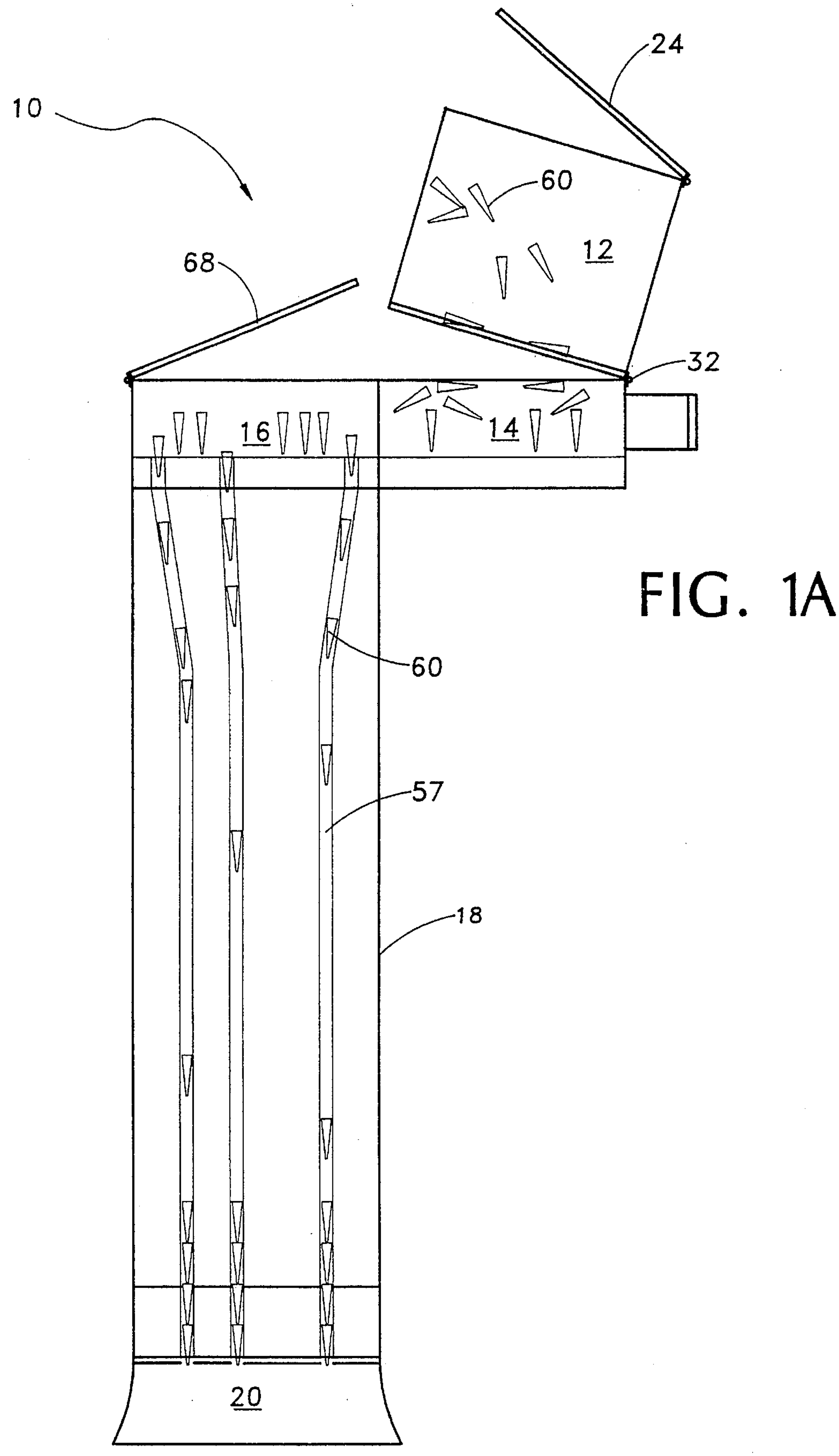

Referring now to FIG. 1 and 1A, the invention is shown generally at 10. A hopper compartment 12 with a cover 24 is mounted over the separator compartment 14 and hinged at 32 thereto. The separator compartment is operatively attached to the organizer compartment 16 and includes cover 68 which overlies the reservoir compartment 18 and the ejection unit 20. Pipettes 60 enter through the hopper and are processed and stored in tubes 57 ready for use.

Figure 2:
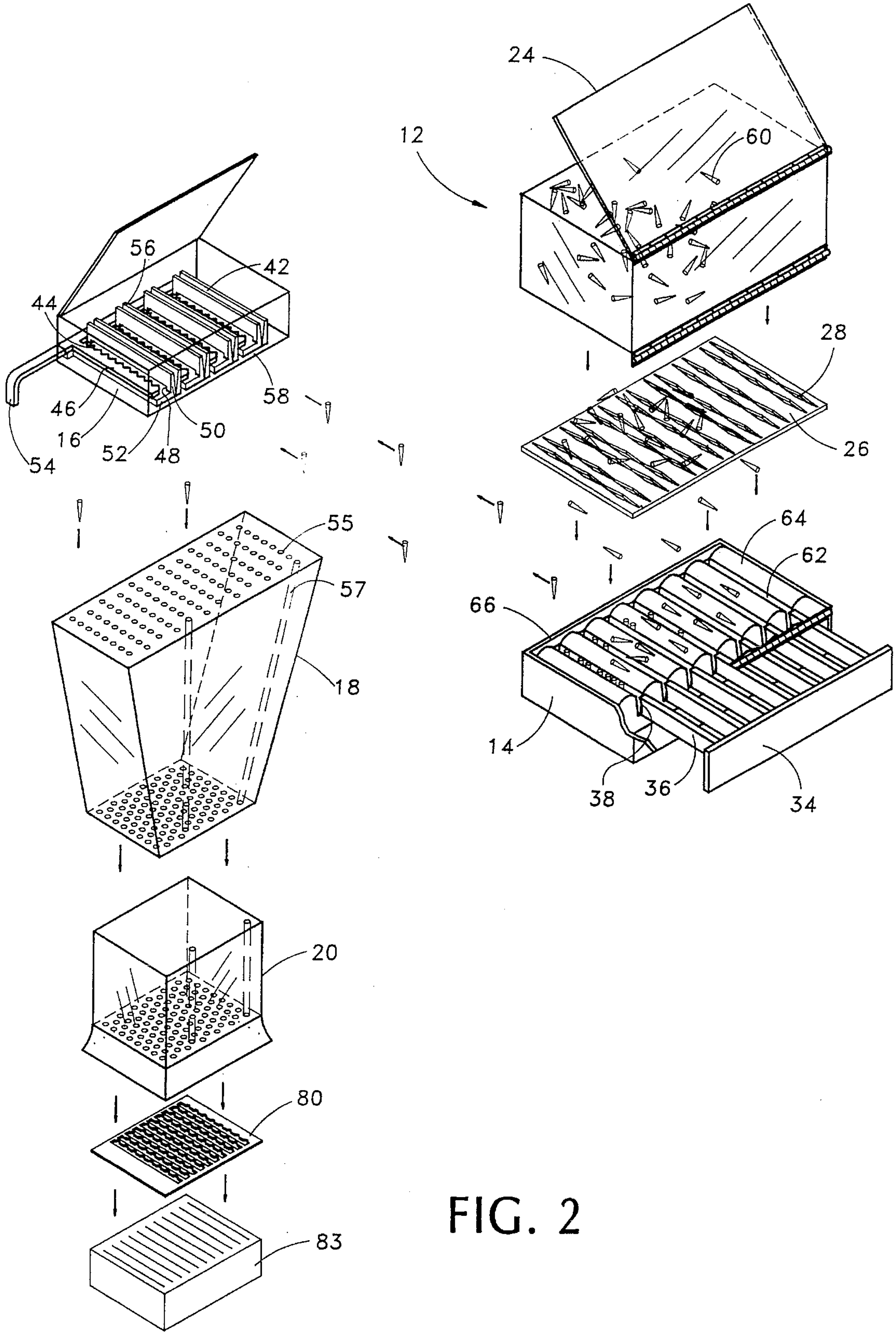
FIG. 2 is an exploded view of the invention showing the components or the invention in general form.

Concerning FIG. 2, the hopper 12 may be formed of plastic and is provided with a continuous hinge 22 for allowing the lid 24 to open and close for, filling the hopper. The base panel 26 of the hopper contains a plurality of diamond shaped apertures 2B arranged to orient the tips and cause them to drop into one of a plurality of parallel troughs 62 in the separator compartment 14. A continuous hinge 32 connects the hopper to the separator compartment and permits access to the separator for maintenance or repair. A pusher panel 34 extends from the separator and is connected via push rods 36 to the tip pushing means 38 for pushing the tips from the troughs 62 in the separator to mating troughs 42 in the organizer compartment 16.

Once in the troughs 42 the tips are spaced by the teeth like projections 44 on slidable spacer bar 46. The spacer bar slides on trough wall extension 52, through aperture 48 and causes the tips to move and separate in the trough and become properly aligned over the apertures 54 and storage tubes 57 in the reservoir compartment 18. The spacer bar 46, operated by handle 54, is withdrawn from aperture 48 in trough wall 50, engages trough wall extension 52 and causes the wall to slide on base 58 and move in a direction away from fixed trough wall 56 thereby allowing the tips to drop into the storage tubes 57. The tips are restrained in the ejector compartment 20 until they are needed to fill the tip holder box 83. Handle 54 is returned to the neutral position where trough wall 50 is spaced from wall 56 to hold tips and spacer bar is withdrawn from aperture 48 and the troughs are ready to accept more tips.

In operation, pipette tips 60 shown in hopper 12 and lying disoriented on base panel or sieve 26. Diamond shaped storing apertures 28 allow the tips to drop through the sieve and enter the multiple troughs 62 in the separator. The arcuate shape of ridge caps 64 facilitate the orientation and movement of the tips into the troughs 62. The separator compartment 14 is affixed to the organizer compartment 16 at wall 66. The tips drop into the troughs and are removed by push rods 36 which are hand operated by applying a force to pusher panel 34. The tips are moved into matching multiple troughs 42 of the organizer compartment 16. The tips are then acted upon as described. Compartment 16 also includes a hinge 66 for cover 68 for maintenance and inspection purposes.

Figure 3:
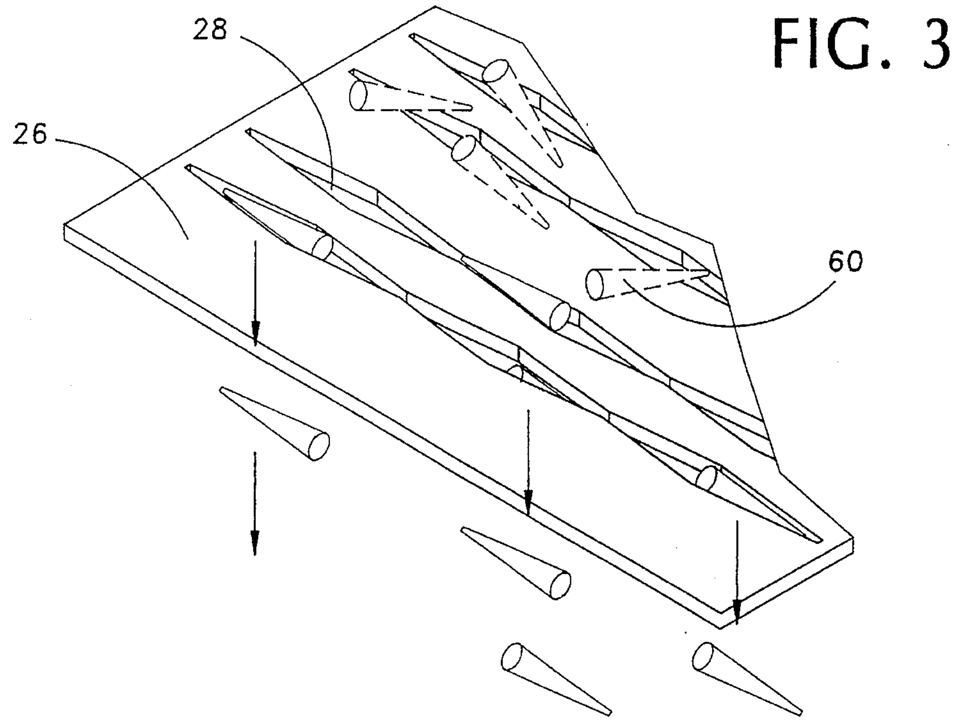
FIG. 3 is a detail view of a section of the sieve structure of FIGS. 1A and 1B.

FIG. 3A shows the base panel or sieve 26 and the relative alignment between the diamond shaped apertures 28, their linear alignment over the troughs in the separator compartment and the action of the tips 60 through the sieve.

Figure 4A:
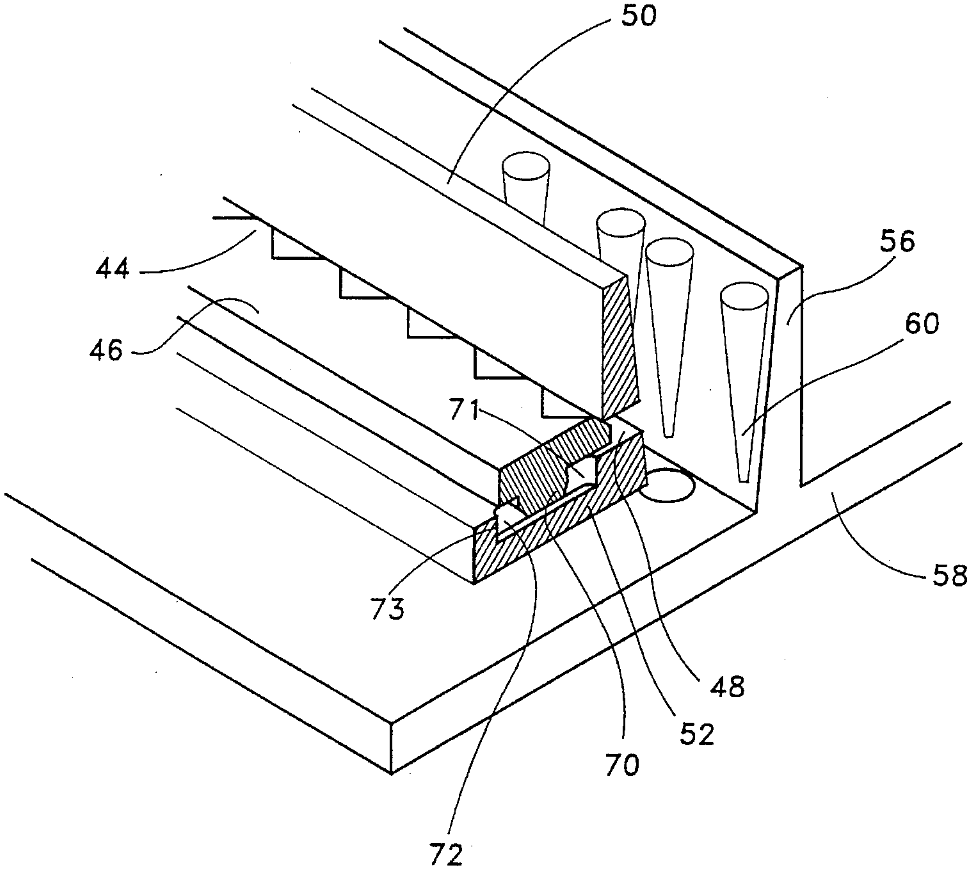
FIGS. 4A, 4B and 4C are detail views of the structure and function of the organizer component.
Figure 4B:
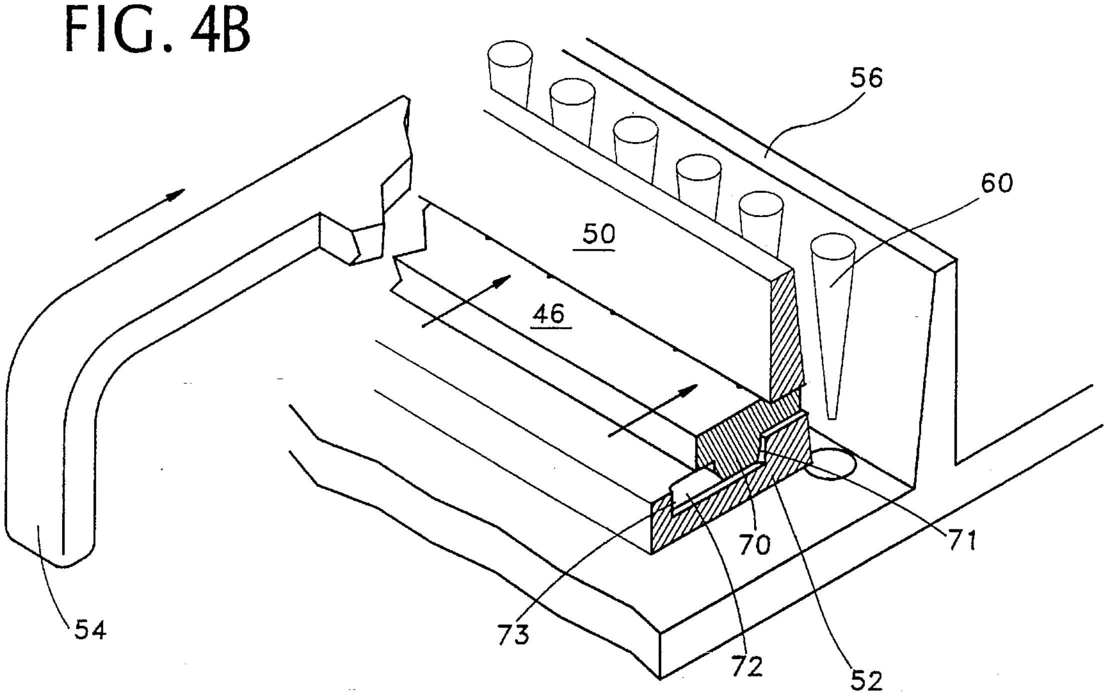
Figure 4C:
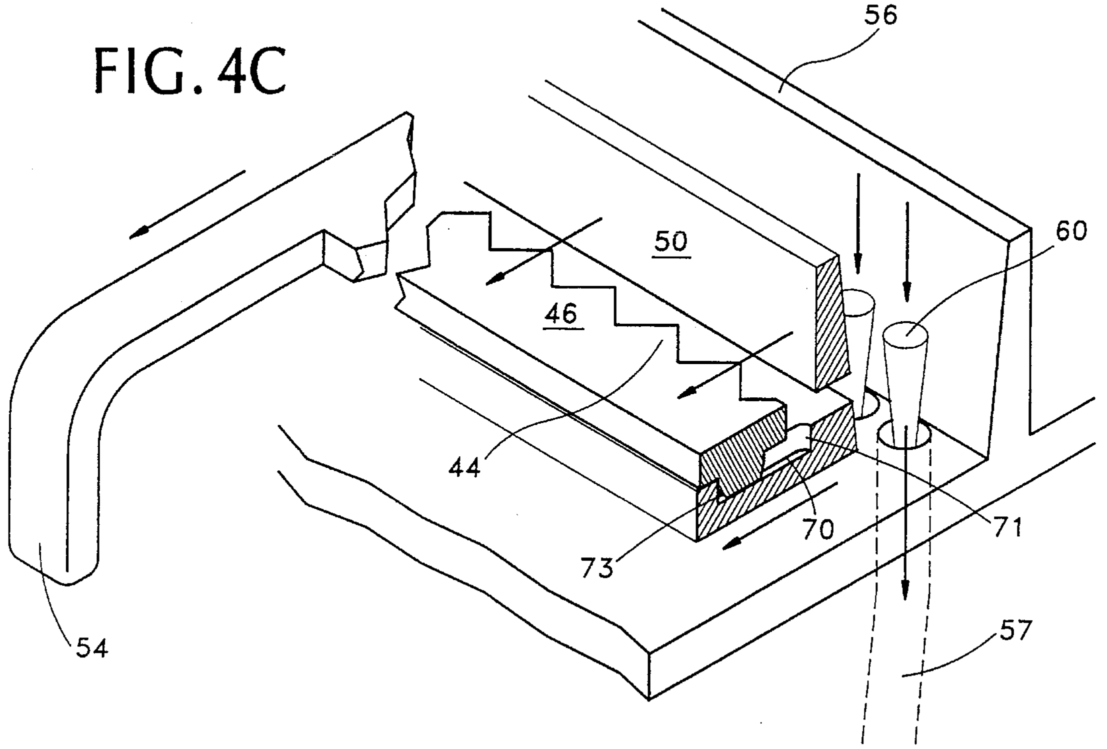

In FIG. 4A is shown the detail of the organizer mechanism. Base plate 58 includes one stationary trough wall 56 for each trough of the mechanism. Tips 60 are secured between stationary wall 56 and movable wall 50. An elongated throughgoing aperture 48 in movable trough wall 50 allows the projections 44 from spacer bar 46 to engage the tips and space them over an aperture for each stacking tube in the reservoir. The relative movement between spacer bar 46 and trough wall extension 52 is controlled by a pair of pin like projections 70 from spacer bar 46, located proximate the ends of the trough wall extension and extending into a mating recess 72 in the trough wall extension. The spacer bar, operated by handle 54 moves toward the stationary wall 56, as shown in FIG. 4B, and when pin 70 reaches the forward wall 71 of recess 72, movable wall 50 takes its position for holding the tips. The handle 54 is moved back part way bringing the projections 44 away from the wall and aperture 48. After the spacer bar has been removed the trough is refilled with pipettes and organized the handle 54 is moved back pulling pin 70 against the rearward wall 73 of recess 72, thereby drawing trough wall 50 away from wall 56 and allowing the tips now aligned and oriented over tubes 57 to drop into a stacked condition, FIG. 4C.

Figure 5A:
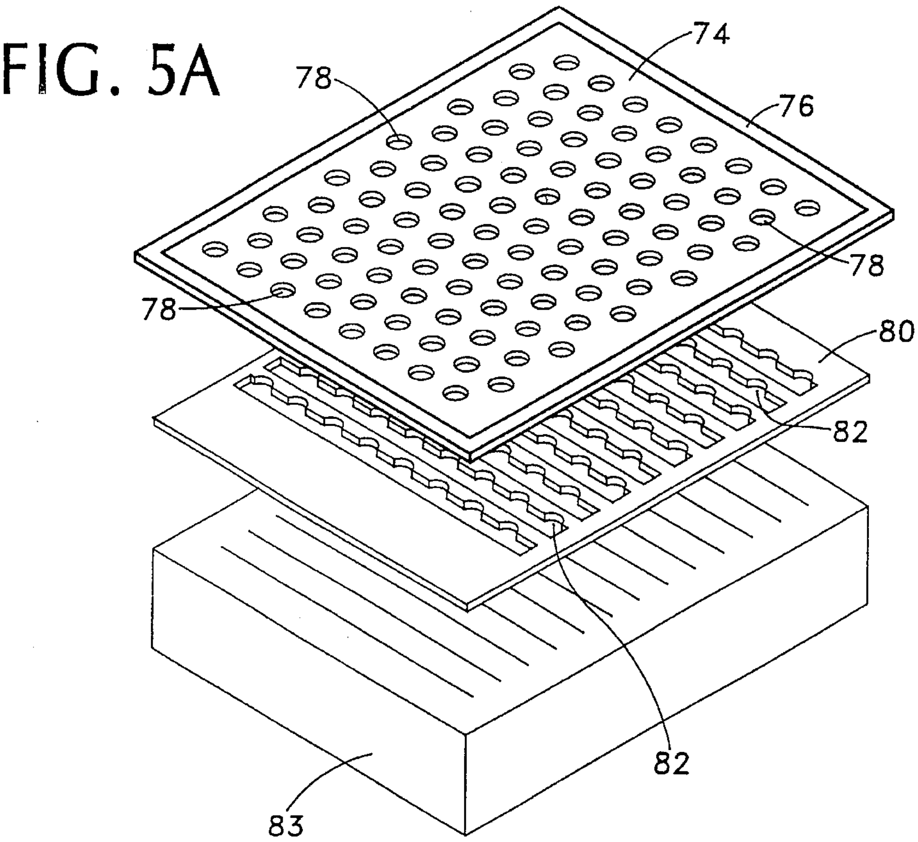
FIGS. 5A, 5B and 5C are perspective, cut away and cross sectional views of the ejector component of the invention.
Figure 5B:
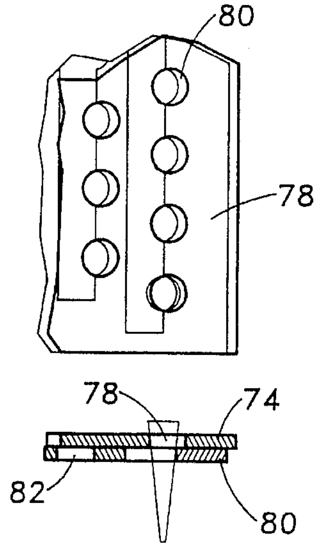
Figure 5C:
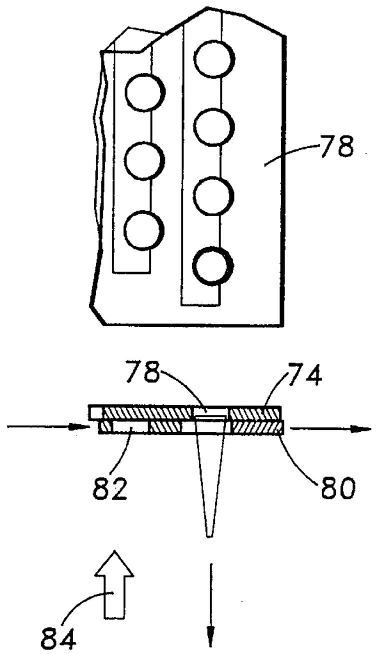

The ejection mechanism is shown in FIGS. 5A, 5B and 5C. A stretchable membrane 74 is mounted in a frame 76 and mounted directly below the stacking tubes in the reservoir compartment 18. The membrane contains one aperture 78 for each tube 57. The aperture is formed slightly larger than the diameter of the largest aspect of the pipette tip 60, in the order of one to two millimeters. A second membrane 80 of the same material is mounted in the frame juxtaposed to the first membrane and on the side opposed to the tips. The second membrane contains apertures 82 similar to the first membrane but substantially larger. The second set of apertures are offset from the first apertures and cover a small portion of the first aperture thereby restraining the tips from falling through the first aperture. The tips are ejected by placing a force in the direction of arrow 84 via a conventional tip holder box 83 against the membrane, stretching the membrane and causing the holes to enlarge and the second, restricting aperture to pull away from the opening and allowing the first layer of tips to drop into the holder. The box is removed and the remaining tips are restrained in the tube.

The ejector mechanism is not dependent upon the separator and organizer sections of the reservoir in that prepackaged tips in vertical nestled series could be used by placing the tips in the stacking tubes via the inspection door 68 and removal of the organizer mechanism.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A dispensing system for pipette tips comprising: a hopper for receiving a bulk supply of pipette tips; a separator means for lining the tips in organized rows; a sieve positioned between the hopper and separator for orienting tips before they enter the separator; means for organizing and spacing the tips; means for moving the tips from the separator to the organizer; means for storing the tips; means for moving the tips from the organizer to the means for storing, and means for ejecting the tips from the storing means to a means for holding the tips ready for use.

2. A dispensing system for pipette tips according to claim 1 wherein: the separator includes a plurality of parallel spaced grooves adapted to receive pipette tips.

3. A dispensing system for pipette tips according to claim 2 wherein: the regions of the separator between the spaced groves are shaped to cause the pipette tips to enter a groove.

4. A dispensing system for pipette tips according to claim 3 wherein: the sieve includes a plurality of rows of a series of diamond shaped apertures overlying the spacer grooves.

5. A dispensing system for pipette tips according to claim 4 wherein: the means for moving include a plurality of pusher means shaped to enter and extend into the said groove and move the tips located therein.

6. A dispensing system for pipette tips according to claim 5 wherein: the means for organizing and spacing includes, a plurality of grooves, where one wall of each grove is movable and has an aperture for receiving a movable separator bar, said bar including means for spacing pipette tips within the groove.

7. A dispensing system for pipette tips according to claim 6 wherein: the organizer groove opens and allows tips to enter the means for storing.

8. A dispensing system for pipette tips according to claim 7 wherein: the means for storing includes a plurality of tubes or chutes located in a cassette proximate the organizer for receiving pipette tips as they leave the said organizer.

9. A dispensing system for pipette tips according to claim 8 wherein: means for ejecting includes a first stretchable membrane having apertures aligned with the means for storing, and a second stretchable membrane juxtaposed with the first membrane and having apertures overlapping the apertures of the first membrane whereby, the membranes will eject one pipette tip each time the membranes are stretched.

* * * * *